(12) United States Patent
Hassani et al.

(10) Patent No.: US 11,390,249 B2
(45) Date of Patent: Jul. 19, 2022

(54) VEHICLE VISION SYSTEM

(71) Applicant: Ford Global Technologies, LLC, Dearborn, MI (US)

(72) Inventors: Ali Hassani, Ann Arbor, MI (US); Ryan Edwin Hanson, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/986,105

(22) Filed: Aug. 5, 2020

(65) Prior Publication Data
US 2022/0041134 A1 Feb. 10, 2022

(51) Int. Cl.
*B60R 25/25* (2013.01)
*B60R 16/037* (2006.01)
*G06K 9/00* (2022.01)
*G06K 9/62* (2022.01)
*G06V 20/56* (2022.01)
*G06V 40/16* (2022.01)

(52) U.S. Cl.
CPC .......... *B60R 25/255* (2013.01); *B60R 16/037* (2013.01); *G06K 9/6268* (2013.01); *G06V 20/56* (2022.01); *G06V 40/172* (2022.01)

(58) Field of Classification Search
CPC ............................. B60R 25/255; B60R 16/037; G06K 9/00288; G06K 9/00791; G06K 9/6268
See application file for complete search history.

(56) References Cited

U.S. PATENT DOCUMENTS

| | | | |
|---|---|---|---|
| 8,457,391 B2* | 6/2013 | Ai | G06V 40/165 382/305 |
| 10,180,782 B2* | 1/2019 | Bovyrin | G06F 3/04847 |
| 10,486,649 B1* | 11/2019 | Bennie | B60R 25/1004 |
| 2007/0015451 A1* | 1/2007 | McGrath | B60H 1/00742 340/425.5 |
| 2015/0309547 A1* | 10/2015 | Huang | G06F 1/263 307/80 |
| 2020/0193005 A1* | 6/2020 | Babala | G06V 40/165 |
| 2020/0238952 A1* | 7/2020 | Lindsay | B60R 21/01 |

FOREIGN PATENT DOCUMENTS

| CN | 102855500 A | 1/2013 |
|---|---|---|
| DE | 10 2016 226 204 B4 | 3/2019 |

* cited by examiner

*Primary Examiner* — Thomas D Alunkal
(74) *Attorney, Agent, or Firm* — Frank Lollo; Bejin Bieneman PLC

(57) ABSTRACT

The present disclosure relates to a vehicle vision system and a method for identifying an entity for access to a vehicle. The system includes a vehicle having one or more vision sensors coupled therewith. Each of the one or more vision sensors produces a vision data signal. The system includes one or more processors, a memory communicatively coupled with the vehicle and the one or more vision sensors. The one or more processors are operable to execute a first classification algorithm operable to performs an initial validation of the vision data signal. The one or more processors are operable to execute a second classification algorithm to perform a validation of the vision data signal. The one or more processors implement the first classification algorithm and/or the second classification algorithm based on one or more vehicle operational settings.

20 Claims, 9 Drawing Sheets

VEHICLE VISION SYSTEM

TECHNICAL FIELD

The present disclosure relates to a vehicle vision system, and more specifically identity identification and authentication.

BACKGROUND

Access to vehicles has been traditionally managed by using physical keys. However, with the physical keys, users of a vehicle need to be in contact with the vehicle for access. Also, replication of physical keys is an easy task, and hence, ensuring the safety of vehicles is questionable. With the advent of remote keyless systems, consisting of a key fob and a vehicle transceiver, the vehicles could be accessed without being in contact by pressing a button on the key fob. Since the key fobs are electronic, replication also becomes a difficult feat to achieve.

Vehicles, in modern days, are equipped with authentication systems using biometrics in order to prevent unauthorized access. However, biometrics can be power intensive when a vehicle is not operating, thereby reducing the vehicles batteries and risking inoperability.

SUMMARY

Face detection and identification is an exemplary method for authentication systems that use biometrics to gain access to vehicle operations. To achieve the method, the authentication systems use vision sensors, such as cameras, for image sensing and processing. The vision sensors are deployed on the vehicles. The authentication system may be activated suo motu or on action from users.

The authentication system may be activated suo motu when a user is within a defined proximity to the vehicle. Vision based localization (to determine the position of the user in relation to the defined proximity) occurs by searching an entire image plane for matching and classification against pre-stored data, to verify the authenticity of the users. Once activated, the authentication system continuously scans the surroundings of the vehicle to determine if the users in the defined proximity are the authenticated users. As a result, the authentication system consumes a uniform power for the continuous scan of the surroundings of the vehicle for the detection and identification of the users in the defined proximity. However, all users in the defined proximity may not be prospectively seeking access to the vehicles. The authentication system, thus, suffers from a longer latency and a greater key-off load.

The present disclosure relates to a system and related methods of managing vehicular access and protecting a vehicle from unauthorized access along with optimizing power consumption. The methods can be achieved by detecting an entity in a field of vision of a vision sensor, identifying the detected entity, and further providing vehicular access to the entity if the identified entity is an authorized entity of the vehicle.

According to one aspect of the present disclosure, a vehicle vision system comprises a vehicle coupled with one or more vision sensors. Each of the one or more vision sensors produces a vision data signal. The vehicle vision system also includes one or more processors and a memory, which are communicatively coupled with the vehicle and/or the one or more vision sensors. The one or more processors are operable to execute a first classification algorithm and a second classification algorithm. The first classification algorithm is operable to perform an initial validation of the vision data signal and the second classification algorithm is operable to perform a validation of the vision data signal. The one or more processors implement the first classification algorithm and/or the second classification algorithm based on one or more vehicle operational settings.

According to one aspect of the present disclosure, a system for detecting and identifying an entity for access to a vehicle comprises at least one vision sensor, which produces a vision data signal. The system also includes one or more processors coupled with a memory. The one or more processors are operable to execute instructions including a first module and a second module. The first module is in operative communication with the vision sensor and comprises an application-specific integrated circuit to execute instructions such as detecting an entity based on the vision data signal and performing an initial validation of the entity. The second module is in operative communication with the first module and uses a strong recognition process to validate the entity of the initial validation and transmit an authentication signal to one or more vehicle operations endpoints based on the validated entity. The one or more processors implement the first classification algorithm and/or the second algorithm based on one or more vehicle operational settings.

In yet another aspect of the present disclosure, a method for identifying an entity for access to a vehicle includes monitoring a field of vision of one or more vision sensors to detect a presence of an entity. The field of vision of the one or more vision sensors comprises a region of focus. The method further uses a weak recognition process for tracking a location of the entity and performing an initial validation when the entity enters the region of focus. Thereafter, a strong recognition process is initiated, whereby facial features of the initially validated entity are compared with a stored template. The initially validated entity is granted access to the vehicle if the facial features of the entity are determined to match the stored template.

BRIEF DESCRIPTION OF THE DRAWINGS

The above-mentioned aspects are further described herein with reference to the accompanying figures. It should be noted that the description and figures relate to exemplary aspects and should not be construed as a limitation to the present disclosure. It is also to be understood that various arrangements may be devised that, although not explicitly described or shown herein, embody the principles of the present disclosure. Moreover, all statements herein reciting principles, aspects, and examples of the present disclosure, as well as specific examples, are intended to encompass equivalents thereof.

Figure 1:
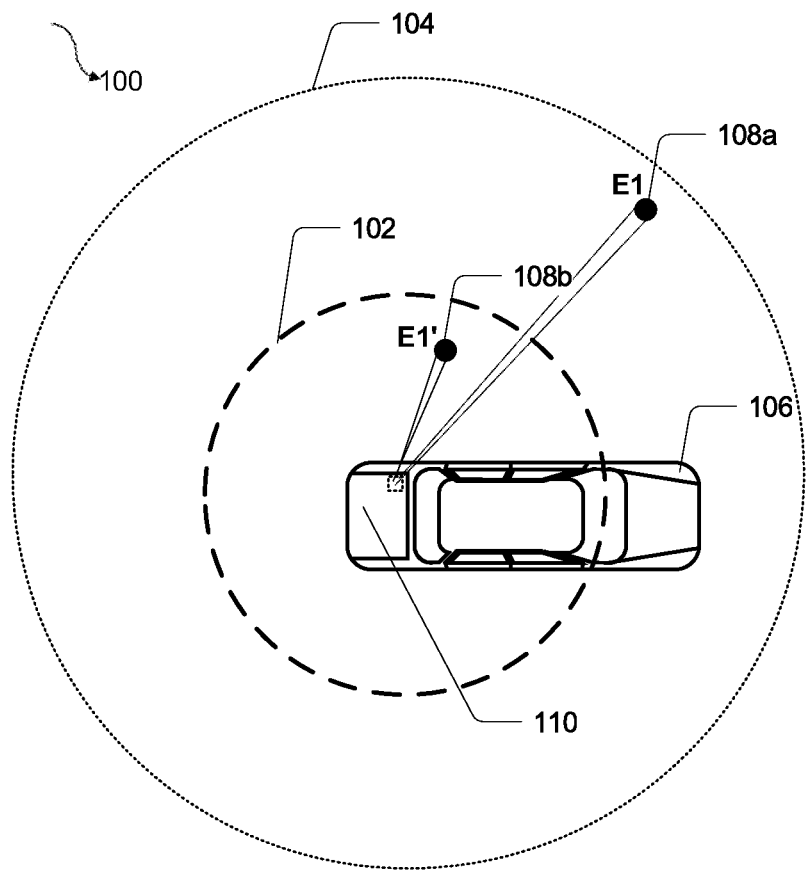
FIG. 1 is a system environment diagram for managing one or more vehicle operations endpoints, in accordance with at least one aspect of the present disclosure.

The figures depict embodiments for purposes of illustration only. One skilled in the art will readily recognize from the following description that alternative aspects of the system and method illustrated herein can be employed without departing from the principles of the disclosure described herein.

DETAILED DESCRIPTION

In the following description, certain specific details are set forth in order to provide a thorough understanding of various disclosed examples. However, one skilled in the relevant art will recognize that examples may be practiced without one or more of these specific details, or with other methods, components, materials, etc.

Unless the context indicates otherwise, throughout the specification and claims which follow, the word "comprise" and variations thereof, such as, "comprises" and "comprising" are to be construed in an open, inclusive sense that is as "including, but not limited to". Further, the terms "first," "second," and similar indicators of the sequence are to be construed as interchangeable unless the context clearly dictates otherwise.

Reference throughout this specification to "one example" or "an example" means that a feature, structure or characteristic described in connection with the example is included in at least one example. Thus, the appearances of the phrases "in one example" or "in an example" in various places throughout this specification are not necessarily all referring to the same example. Furthermore, the features, structures, or characteristics may be combined in any suitable manner in one or more examples.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The present disclosure provides examples directed to a vehicle vision system, herein after referred as a system, to manage access to a vehicle by detecting an entity based on a vision data signal generated by one or more vision sensors. The detection takes place by a twofold process.
  a. A first module of one or more processors of the system using a weak recognition process, which employs a first classification algorithm. The first classification algorithm helps to initially validate the entity by using a low computation detection technique.
  b. A second module of the one or more processors of the system using a strong recognition process, which employs a second classification algorithm. The initially validated entity can be identified by the second classification algorithm by using a detection technique, which is, computationally, more powerful and complex than that employed by the first classification algorithm.

An authentication signal may be provided to one or more operations endpoints of the vehicle if the detected entity is identified as an authorized entity of the vehicle. The system can switch between the first classification algorithm and the second classification algorithm based on context provided by one or more operational settings.

The aspects of managing access to the vehicle are configured for reducing a key-off load in the vehicle by detecting and initially validating the entity using the weak recognition process and identifying the detected entity by using the strong recognition process. The weak recognition process utilizes the first classification algorithm, while the strong recognition process utilizes the second classification algorithm. The weak recognition process can consume lower power and/or processing capacity while the strong recognition process can utilize high power and/or processing capacity. The strong recognition process includes more compute features than the weak recognition process.

It should be noted that, at the weak recognition process, the one or more vision sensors can operate at a low-resolution mode and/or generate a low-resolution image of the entity by downsampling the vision data signal. Further, the weak recognition process includes reduced sampling rate and reduced illumination. The reduced illumination corresponds to both output power and duty cycle duration. While for identifying the detected entity by the strong recognition process, the one or more vision sensors can operate at a high-resolution mode with higher frame rate and/or generate a high-resolution image along with higher illumination of the entity by upsampling the vision data signal. The system performs a validation of the entity at two stages by involving a differential power requirement, thus reducing overall power consumption to enable management of vehicular access and optimizing key-off load in the vehicle.

The system is configured to perform a face detection throughout the validation. In one aspect, the system utilizes one or more image-based derivatives such as color histograms and/or contrast of the image for identifying the detected entity using the strong recognition process. The high-resolution image of the entity generated at the strong recognition process can be compared with similar derivatives, such as the color histograms of images of authorized entities, which may be prestored in the system. Thus, if the derivative of the high-resolution image most closely corresponds to the prestored derivative, then the detected entity is identified by the system. In an embodiment, the strong recognition process may perform the initial validation.

FIG. 1 illustrates an environment 100 including a vehicle 106, one or more vision sensors 110 mounted on the vehicle 106 and one or more proximity sensors (not shown in FIG. 1). The proximity sensors detect presence of entities surrounding the vehicle 106 and measures the distance between an entity and the vehicle 106. The environment 100 further includes an entity E1 108a located within a vicinity of the vehicle 106, in accordance with one aspect of the present disclosure. The one or more vision sensors 110 can include one or more cameras configured to collectively cover a field of vision 104 around the vehicle 106. The proximity sensors determine if the entity is in the field of vision 104 or in a region of focus 102 and track location of the entity.

The proximity sensors, upon determining that any entity is within the field of vision 104 or the region of focus 102, triggers the one or more vision sensors 110. The one or more vision sensors 110 are configured to capture an image of the entity E1 108*a* and generate a vision data signal. In the illustrated aspect, the one or more vision sensors 110 may be exterior cameras, that are visible cameras, mounted on at least a portion on an exterior region of the vehicle 106. In an example, the one or more vision sensors 110 are located internal to the vehicle 106. In alternate examples, the one or more vision sensors 110 may include a stereo and/or a three-dimensional vision system. In another example, the one or more vision sensors 110 can be a pair of two-dimensional cameras configured to function as a stereo pair to capture a three-dimensional image in a determined image plane of the entity E1 108*a*. Additionally, the one or more vision sensors 110 can be a single camera to capture a three-dimensional image of the entity E1 108*a* using a modulated light to generate an image data. In an alternate aspect, the one or more vision sensors 110 may be mounted on at least a portion on an interior region of the vehicle 106. In an embodiment, the one or more vision sensors 110 include thermal cameras or visible cameras or a combination thereof. The thermal camera and the visible camera can be co-registered, where images from the thermal camera and visible camera pair that are co-registered are geometrically aligned so that corresponding pixels, that are registered and are representing the entity E1 108*a* are integrated or fused. The images, for example, are non-stereo images If the proximity sensors determines that any entity or the entity E1 108*a* is within the field of vision 104, then the proximity sensors trigger a weak recognition process. The weak recognition process can utilize the vision data signal from the one or more vision sensors 110 to detect and initially validate the entity E1 108*a* when the entity E1 108*a* is in the field of vision 104. It should be noted that for the one or more vision sensors 110, the field of vision 104 is defined as a recognition area. The recognition area is determined in the image based on location of head or face of the entity E1 108*a* and the number of pixels detected. The recognition area is measured as a distance to which the one or more vision sensors 110 can generate an undistorted image of the entity E1 108*a*. The field of vision 104 defines a recognition area within the region of focus 102 when the entity E1 108*a* is detected by a first classification algorithm.

If the proximity sensors determine that any entity or entity E1' 108*b*, who has been detected and initially validated by the weak recognition process while in the field of vision 104, is within the region of focus 102, then the proximity sensor triggers a strong recognition process. The strong recognition process can be configured to identify the entity E1' 108*b* when the entity E1' 108*b* moves to a region of focus 102 of the one or more vision sensors 110. The region of focus 102 is defined as an area restricted to a radius of a predetermined distance being calibrated around the one or more vision sensors 110. In at least one instance of the present disclosure, the predetermined distance may be 1 meter. In an alternate embodiment, a region of focus (not shown in FIG. 1) is restricted by a contour that defines an expected location of head of the entity E1 108*a*. The region of focus 102 is utilized to identify the initially validated entity E1' 108*b*. The initially validated entity E1' 108*b* who is identified as the validated entity E1' 108*b* by the strong recognition process, if identified as the authorized entity, can manage one or more vehicle operations endpoints, as shown in FIG. 2, including, but not limited to, starting the vehicle 106 or a Passive Entry Passive Start (PEPS) operation.

The triggering of weak recognition process and the strong recognition process based on the tracked location of the entity allows selective activation of the weak and the strong recognition process. The entity location based activation of the vision sensors 110 and entity location based selective activation of the weak and strong process aids in optimal power consumption by the system.

In at least one example, one or more vehicle support features such as a Welcome Mode feature is automatically activated once the entity E1 108*a* is initially validated in the field of vision 104. The initially validated entity E1' 108*b* is identified and granted permission to manage the one or more vehicle operations endpoints if the initially validated entity E1 108*a* is in the region of focus 102. Further, the system can be configured for automatically switching between the weak recognition process and the strong recognition process to reduce key-off load and thus, facilitate in optimizing power consumption involved in detection, initial validation, validation and identification of the entity E1' 108*b*.

Figure 2:
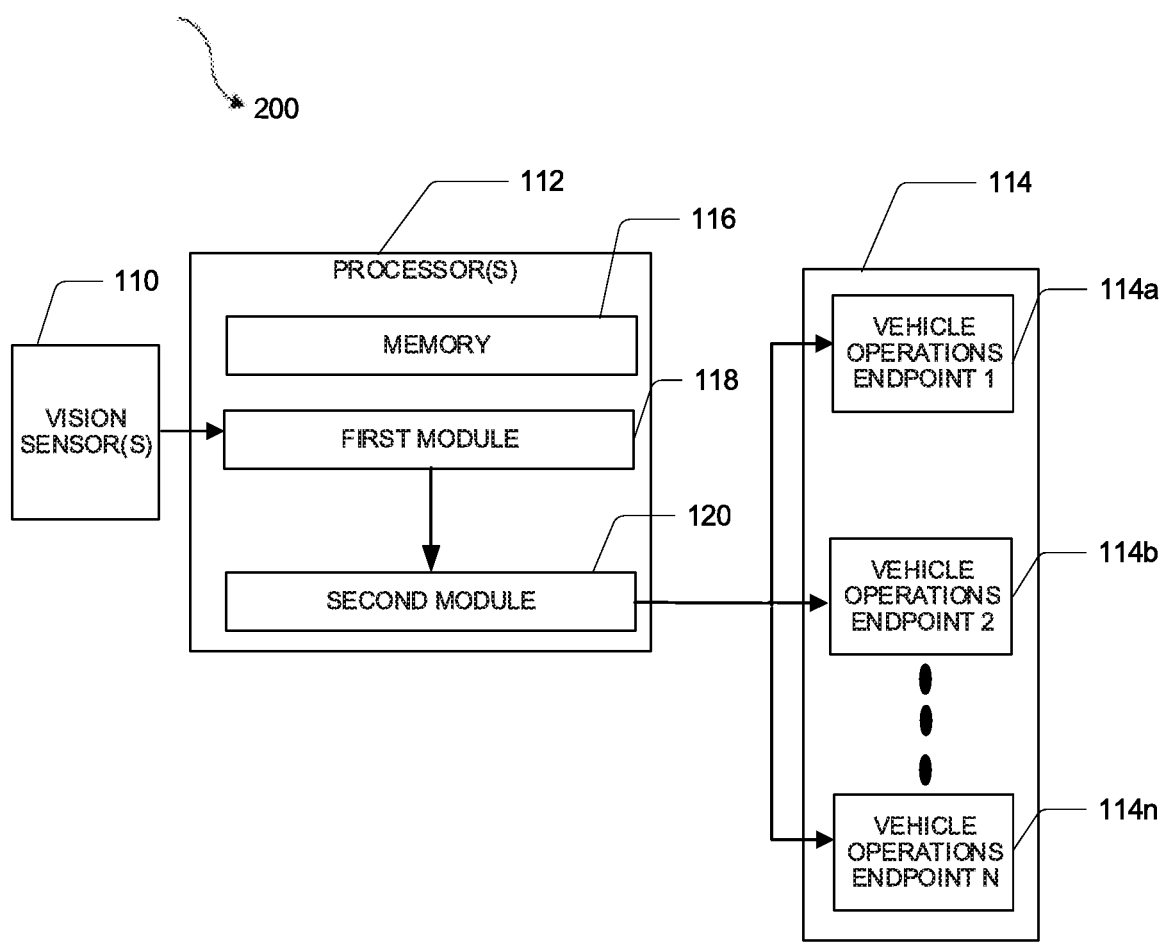
FIG. 2 illustrates a block diagram of a system configured to manage one or more vehicle operations endpoints, in accordance with at least one aspect of the present disclosure.

One or more processors, as shown in FIG. 2, implement the first classification algorithm and/or a second classification algorithm based on one or more operational settings, that is, vehicle operational settings. The operational settings include biometric authentication. In an embodiment, the initial validation is performed using the strong recognition process. The system automatically switches from weak recognition process to the strong recognition process upon determining requirement of a security feature, such as passive entry, passive start, secure idle, and payments authentication.

The vehicle 106 includes one or more operational settings such as an interior monitoring feature as an operational setting where interiors of the vehicle 106 is monitored for security and health of occupants of the vehicle 106. In the interior monitoring feature, the first classification algorithm includes low powered face detection with verification of pixels on target and location in image plane in the interior of the vehicle 106 using an identification technique, for example, Support Vector Machine (SVM). In the interior monitoring feature, the second classification algorithm can include a detailed emotion and/or stress analysis that, for example, includes thermal camera for health tracking.

The second classification algorithm can be used for cabin temperature monitoring to determine and maintain ambient interior cabin temperature of the vehicle 106. Also, the second algorithm is used for periodic check of temperature of the one or more occupants of the vehicle 106 using, for example, the thermal cameras, for monitoring health of the occupants. If the occupants are determined to be healthy, then the vehicle 106 reverts from the usage of the second classification algorithm to the first classification algorithm.

For example, if the interior cabin temperature is low, that is for example 64° F. and if the temperature of the one or more occupants of the vehicle 106 is more than an average normal body temperature that is 98° F., then the second classification algorithm, with the vehicle 106 in the operational setting as the interior monitoring feature, notifies the authorized entity. The second classification algorithm utilizes one or more communication protocols or modes of communication to notify the authorized entity.

The vehicle 106 may also include a thermal animal detection feature as an operational setting that includes detection of animals in proximity of the vehicle 106 using the one or more vision sensors 110, such as, the thermal cameras due to obstructions in nature, for example, an animal that is hiding behind a bush can be detected using the thermal camera. In the thermal animal detection feature, the first classification algorithm performs functions as disclosed in the sentry mode feature. In the thermal animal detection feature, the second classification algorithm includes engagement of the thermal cameras with animal classification, including threat analysis based on gait, animal stress recognition, etc.

The second classification algorithm is used for motion detection above a predetermined threshold along with verification. The vehicle 106 switches from the usage of second classification algorithm to the first classification algorithm if the animals found are determined that they are not a threat or if no animals are found.

The vehicle 106 includes a pet mode if the initial validation is consistent with a stored template for a pet and/or animal in the interior of the vehicle 106. If the operational setting is the pet mode, then the system activates one or more comfort settings of the vehicle 106. The comfort settings are, for example, maintaining temperature of the interior of the vehicle 106 to a user predefined temperature that provides comfort to a pet left in the vehicle without the occupant in the pet mode.

The vehicle 106 includes a biometric key power mode feature as an operational setting that supports deviceless key entry through vision biometrics. In the biometric key power mode feature, the first classification algorithm includes a low powered face detection with verification of pixels on a target and a corresponding location in an image plane using an identification technique, for example, Support Vector Machine (SVM). In the biometric key power mode feature, the second classification algorithm includes secure identification for biometric access, for example, neural networks or deep learning, with a potential liveness verification. In an example, the second classification algorithm includes camera fusion such as fusion of the stereo and thermal cameras.

The first classification algorithm can be used for proximity detection to justify using the second classification algorithm. The vehicle 106 switches between the first classification algorithm and the second classification algorithm based on context provided by the operational settings. For example, after a validation using the second classification algorithm, the first classification algorithm is used to track presence of the validated entity's E1' 108b until the entity E1'108b requests a security feature such as access, passive start, payments, etc. The first classification algorithm tracking is sufficient for personalization and logging into infotainment accounts.

FIG. 2 illustrates a block diagram of a system 200 to enable the environment as described in FIG. 1. The system 200 is configured to manage one or more vehicle operations endpoints 114 to detect and prevent unauthorized access to the vehicle 106, in accordance with one aspect of the present disclosure. The vehicle 106 described herein, may include an electric vehicle, a hybrid vehicle, an autonomous vehicle, a semi-autonomous vehicle, or a heavy vehicle. Further, managing of the one or more vehicle operations endpoints 114 may include, but not limited to, at least one of a Passive Entry Passive Start (PEPS) operation, unlocking/locking a door or a trunk of the vehicle 106, starting the vehicle 106 or any other vehicular operation as known to a person of ordinary skill in the art.

In an illustrated aspect, the system 200 includes the one or more vision sensors 110 mounted at various positions on the vehicle, such as the vehicle 106. The various positions may include driver side of the vehicle 106, passenger side of the vehicle 106 and/or tailgate (e.g. rear) of the vehicle 106. The one or more vision sensors 110 are configured to cover different angles of the field of vision 104 of the vehicle 106 and capture an image data to generate the vision data signal. Further, the one or more vision sensors 110 may be mounted to at least a portion on an exterior and/or an interior region of the vehicle 106. In at least one example, the one or more vision sensors 110 may be mounted on an upper portion of the vehicle 106 to provide the image data of the entity E1 108a that is located within a defined vicinity of the vehicle 106. A defined vicinity constitutes an area around the vehicle 106 that is covered by the field of vision 104 of the one or more vision sensors 110. In another example, the one or more vision sensors 110 may be mounted inside the vehicle 106, such as in a cabin of the vehicle 106, to generate personalization information of the entity E1 108a to execute the initially validated entity's E1 108a request to perform the one or more vehicle operations.

In at least one aspect of the present disclosure, the entity E1 108a may include a person located in the defined vicinity of the vehicle 106. In at least one example, the person and/or the entity E1 108a may be the authorized entity of the vehicle 106 with limited or complete access to the vehicle 106. In another example, the person or the entity E1 108a may be an unauthorized entity of the vehicle 106 with denied access to the vehicle 106.

The system 200 also includes one or more processors 112 including a memory 116, a first module 118, and a second module 120. The one or more processors 112, in this and other embodiments, may include one or more of a microprocessor, a microcontroller, a field-programmable gate array (FPGA), a complex programmable logic device (CPLD), an application-specific integrated circuit (ASIC), a graphics processing unit (GPU), a tensor processing unit (TPU) and/or any other electronic computing device. The memory 116 may be any suitable computer-readable medium, such as an optical disc, hard disk, solid-state memory, flash memory, etc., and maybe non-recordable or recordable. The one or one or more processors 112 and the memory 116 are communicatively coupled with the vehicle 106 and/or the one or more vision sensors 110.

The first module 118 can be operably connected to the one or more vision sensors 110 and is configured to receive the vision data signal generated by the low-resolution mode of the one or more vision sensors 110. On receiving the vision data signal, the first module 118 can execute instructions to process successive frames of the image data, which generated the vision data signal, by using the weak recognition process.

The first module 118 can track the entity E1 108a, which has been detected by the one or more vision sensors 110. In order to achieve tracking of the entity E1 108a, the first module 118 may trim the recognition area of the one or more vision sensors 110 to the expected location of the head of the detected entity E1 108a. The first module 118 may use a vision-based object contour sensor (not shown in FIG. 1), which is a weak recognition process, that tracks a location of human heads, that is the location of the entity E1 108a, within the image data of the vision data signal using a head shape as a cue. In an alternate embodiment, the first module 118 may use a vision-based color sensor (not shown in FIG. 1), which can track a location of human heads in the image data of the vision data signal using head color as a visual cue.

It should be noted that the system 200 aims at managing a key-off load for the vehicle 106 for optimizing power consumption involved in the detection and identification of the entity E1 108a. For achieving this, the first module 118 draws a predetermined computational power from a first power source (not shown in FIG. 2) disposed on the system 200. It should be noted that the first power source that supplies the predetermined computational power to the first module 118 is dedicated to the first module 118. In an alternate embodiment, the one or more processors 112 draw computational power from the first power source. Specifically, for detecting a presence of the entity E1 108*a*, the first module 118 performs the weak recognition process on the image data by utilizing one or more low computational detection techniques. Some of the exemplary low computational detection techniques may include, but not limited to, a) a gradient detection executed by selecting one or more start points on a low-intensity gradient of the image data,
b) a contour detection by estimating the size of the entity E1 108*a* using dimensions extracted from a boundary contour representing the entity E1 108*a*,
c) capturing a frame of the entity E1 108*a* using the image data,
d) anchor-based detection in which one or more key points in the image data of the entity E1 108*a* are compared with a pre-stored threshold; the threshold is regarded as an anchor point,
e) a seminal cascade face detection of detecting face factors varying in scale, illumination, expression, pose, and occlusion.

The first module 118, with the first classification algorithm, is communicatively coupled to the first memory bank (not shown in FIG. 2). The first memory bank stores template signals or data representative of the authorized entity. The first module 118 utilizes a stored template of the authorized entity in the first memory bank to initially validate the detected entity E1 108*a*. The initial validation takes place once the detected entity E1 108*a* moves from a present location in the field of vision 104 to the region of focus 102 of the one or more vision sensors 110. In an alternate embodiment, the system 200 may enable the initial validation while the detected entity E1 108*a* remains in the present location in the field of vision 104. The initial validation is either the stored template match for identification or a verification of location in image for example, sufficient pixels on target, to ensure a requirement of usage of strong recognition.

A signal generated by the first module 118, particularly, corresponds to a downsampled image data with a low-resolution, a substantially reduced frequency, reduced illumination, reduced contrast due to reduced illumination, and a reduced number of pixels. The first module 118 consumes the predetermined computational power for detecting the entity E1 108*a*. It should be noted that the first module 118 is linked to the second module 120 and upon detection and initial validation of the entity E1 108*a*, the first module 118 sends the signal to the second module 120.

On receiving the signal from the first module 118, the second module 120 is activated and executes the strong recognition process to identify the initially validated entity E1' 108*b*. For this, the second module 120 draws a predetermined computational power, which is higher than the predetermined computational power drawn by the first module 118, from a general power source (not shown in FIG. 1) disposed on the system 200. It should be noted that the general power source that supplies the predetermined computational power to the second module 120 is distinct from the first power source that supplies the predetermined computational power to the first module 118. In the alternate embodiment, where the one or more processors 112 draw computational power from the power source, the first module 118 and the second module 120 may draw the predetermined computational power from the first power source.

The second module 120, with the second classification algorithm, is communicatively coupled to a second memory bank (not shown in FIG. 2). The second memory bank stores template signals or data representative of the authorized entity. The first memory bank and the second memory bank are collectively referred as memory bank. The memory bank is also referred as memory module. The second classification algorithm is used for performing the strong recognition process.

For identification of the detected and initially validated entity E1' 108*b*, the second module 120 performs the strong recognition process on the signal by utilizing one or more high computational detection techniques. The strong recognition process matches the initially validated entity E1' 108*b* with a stored template of the authorized entity. The strong recognition process may include liveness verification by characterizing properties of the face to conclude it is a living person including, but not limited to, depth, color analysis, texture analysis, specular reflection analysis, and/or thermal analysis, etc. The stored template is in the second memory bank. Some of the exemplary one or more high computational detection techniques include, but not limited to, a) a neural-based technique,
b) a trained model-based technique,
c) a cascade face detection technique including a face identification/verification through identifying large variations in scale and occlusion.

An authorized validation is the biometric authentication of the stored template such as a stored facial template, a stored iris template, and/or a stored gait template of the entity E1' 108*b* within the field of vision 104 for the first and the second classification algorithms.

Figure 3:
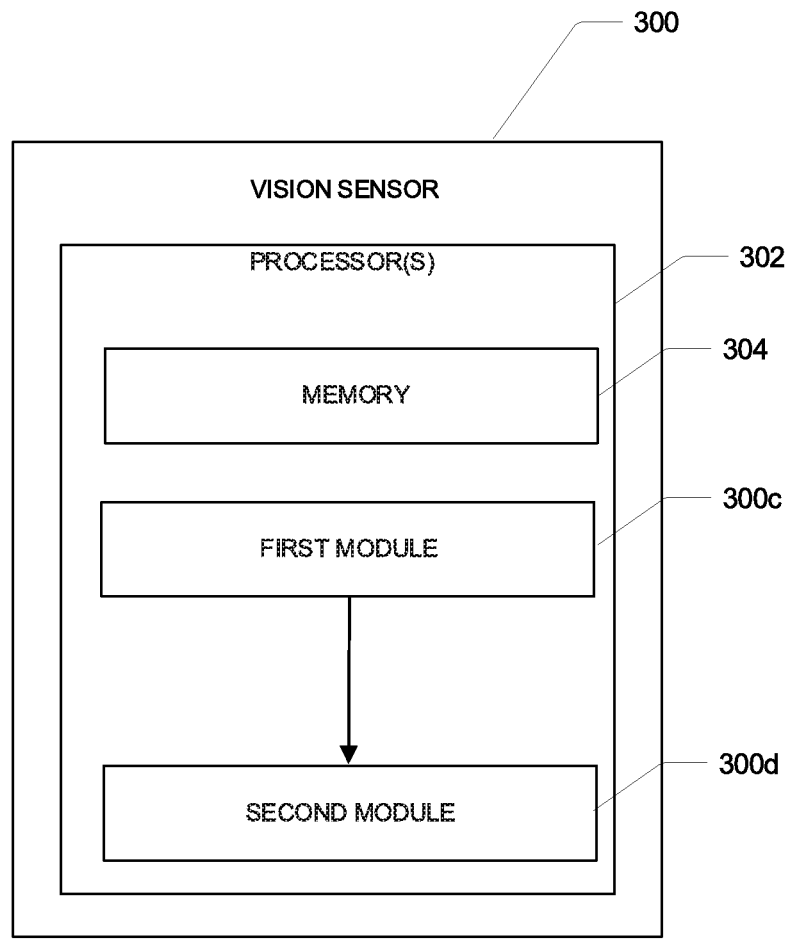
FIG. 3 illustrates a vision sensor, in accordance with at least one aspect of the present disclosure.

In an alternate embodiment, the one or more processors 112 may be built in the one or more vision sensors 110. For example, as shown in FIG. 3, one or more vision sensors 300 include one or more processors 302, a memory 304, a first module 306, and a second module 308. The one or more processors 302 may be integrally built with at least a circuitry of the one or more vision sensors 300. In another example, the one or more processors 302 may be disposed in at least a portion of the one or more vision sensors 300.

Referring to FIG. 2, the system 200 further includes one or more vehicle operations endpoints 114*a*, 114*b*, . . . 114*n* collectively referred as vehicle operations endpoints 114. It should be noted that the vehicle operations endpoints 114 may include an ignition system, a vehicle door lock or trunk lock/unlock switch or any other system related to one or more operations of the vehicle 106. Managing the vehicle operations endpoints 114 may include a task to be executed for accessing the vehicle 106. For example, the vehicle operations endpoint 114*a* may include the door lock and managing the vehicle operations endpoint 114*a* may include tasks of locking or unlocking the door lock of the vehicle 106.

If the initially validated entity E1' 108*b* is consistent with the stored template of the authorized entity, the second module 120, which is communicatively coupled to the one or more vehicle operations endpoints 114 transmits an authentication signal thereto. It should be noted that the authentication signal may include a positive authentication signal or a negative authentication signal.

In one example, the positive identification signal represents that the detected and initially validated and the validated entity E1' 108*b* is identified as the authorized entity, who has requested to perform the at least one task corresponding to the managing of the one or more vehicle operations endpoints 114. Thus, the system 200, on the generation of the positive identification signal, grants permission to the initially validated entity E1' 108*b* to perform the one or more tasks corresponding to the managing of the one or more vehicle operations endpoints 114, including the task of starting the vehicle 106. While a generation of the negative authentication signal represents that the detected and initially validated entity E1' 108*b* is identified as the unauthorized entity by the second module 120. Accordingly, the detected and initially validated entity E1' 108*b* is denied permission to perform the at one or more tasks on the one or more vehicle operations endpoints 114.

Figure 4:
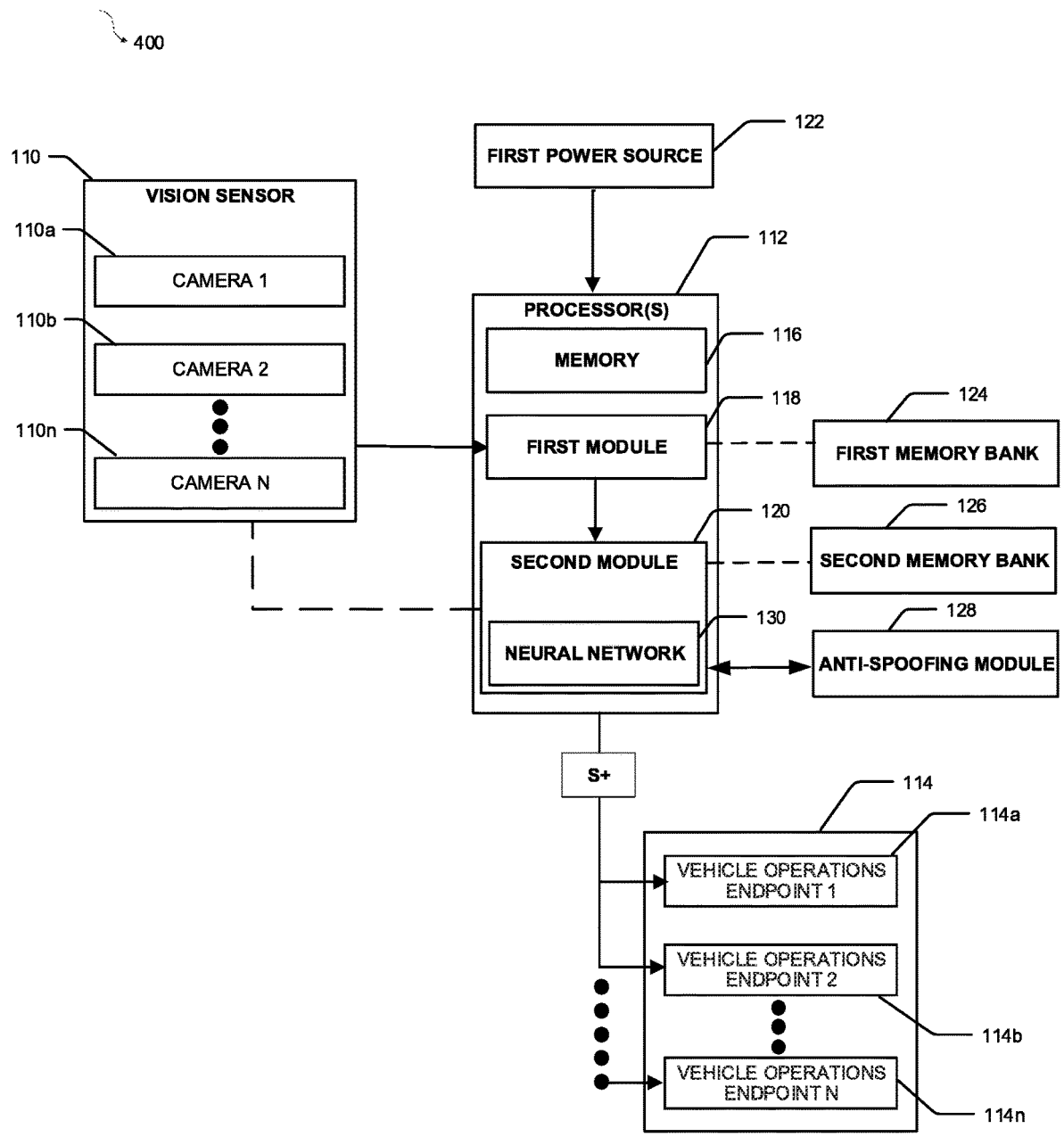
FIG. 4 is a block diagram illustrating a detailed view of the system of FIG. 2, as per at least one aspect of the present disclosure.

FIG. 4 is a block diagram illustrating a detailed view of the system 200 of FIG. 2, as per one aspect of the present disclosure. A system 400, illustrated herein, is configured to detect and initially validate the entity E1 108*a*, identify the initially validated entity E1' 108*b*, and further authenticate the identified entity E1' 108*b* to manage the one or more vehicle operations endpoints 114 (as described in FIGS. 1 and 2).

As illustrated, the system 400 includes the one or more vision sensors 110 that are configured to capture the image data and generate the vision data signal corresponding to the captured image data. The one or more vision sensors 110 includes one or more cameras 110*a*, 110*b* . . . 110*n* mounted on at least a portion on the exterior region or the interior region of the vehicle 106. The one or more cameras 110*a*, 110*b* . . . 110*n* collectively cover a field of vision 104 around the vehicle 106 to generate the vision data signal. The one or more cameras 110*a*, 110*b* . . . 110*n* are the visible cameras and/or the thermal cameras or a combination thereof. The vision data signal corresponds to the image data of the entity E1 108*a* located within the defined vicinity of the vehicle 106.

In one example, the one or more vision sensors 110 may also include a stereo and/or a three-dimensional vision system. In another example, the one or more vision sensors 110 may include a pair of two-dimensional cameras configured to function as a stereo pair to capture a three-dimensional image data in a determined image plane of the entity E1 108*a*. Alternately, the one or more vision sensors 110 may include a single camera to capture a three-dimensional image of the entity E1 108*a* using a modulated light to generate the image data.

The one or more vision sensors 110 can be configured to perform one or more functions such as an image sensing of the entity E1 108*a* located within the defined vicinity of the vehicle 106 in the field of vision 104 of the one or more vision sensors 110. While performing the one or more functions, the one or more vision sensors 110 may operate in a low-resolution mode and a high-resolution mode. In the low-resolution mode, the one or more vision sensors 110 generate a low-resolution image data while in the high-resolution mode, the one or more vision sensors 110 generate a high-resolution image data.

In the context of the present disclosure, the term "resolution of an image", "resolution" or other such terms are intended to refer to how large a field of view is imaged per pixel. More specifically, the resolution is how the field of view, which is being imaged, is divided by a number of pixels, such as a horizontal field of view of the image data divided by a width of the image data in pixels, or a vertical field of view of the image data divided by a height of the image data in pixels. Thus, the high-resolution image data has many pixels per degree field of view, whereas the low-resolution image data has fewer pixels per degree field of view. Further, on sensing the presence of the entity E1 108*a*, the one or more vision sensors 110 generate the vision data signal corresponding the image data.

The system 400 additionally includes the one or more processors 112, which include the memory 116, the first module 118, and the second module 120. The memory 116 includes a database comprising prestored data that corresponds to facial feature values of entities and gait of the entities, who can be prospectively authorized for managing the one or more vehicle operations endpoints 114 (as shown in FIG. 2).

The one or more processors 112 processes gait of the entity E1 108*a*. Specifically, the one or more processors 112 processes the facial features and computes facial feature values of the entity E1 108*a*. The facial features are a subset of the one or more features of the entity E1 108*a*. It should be noted that the facial feature value is determined as a function of the facial features. In one aspect of the disclosure, retina of eyes may be considered as a facial feature. In one aspect of the disclosure, pigmentation of the iris of eyes may be considered as a facial feature. For purposes of illustration, pigmentation of the iris of the eye may be considered as amber, blue, green, brown, gray, or hazel. The facial feature value is ascribed to each pigmentation, for example,

| Pigmentation of the iris of the eye | Corresponding facial feature value |
| --- | --- |
| Amber | 10 |
| Blue | 8 |
| Green | 6 |
| Brown | 4 |
| Gray | 3 |
| Hazel | 2 |

It should be noted that the entity E1 108*a* is in the field of vision 104 as covered by the one or more vision sensors 110. In the illustrated aspect, the system 400 is configured to detect the entity E1 108*a* by utilizing the facial feature values of the entity E1 108*a*. If the facial feature value, as computed by the one or more processors 112, is below a predetermined threshold, the one or more processors 112 triggers the first module 118. Referring to the above example, the threshold value for the facial feature value corresponding to the pigmentation of the iris may be predefined as 6. Accordingly, vision data signal corresponding to image data for all entities whose pigmentation of iris of the eye is either green, brown, gray, or hazel (referring to the above example) will trigger the first module 118.

The first module 118, being communicatively coupled to the one or more vision sensors 110, is configured to receive the vision data signal therefrom. On receiving the vision data signal, the first module 118 performs a real-time image processing on the low-resolution image data of the vision data signal by executing the weak recognition process. The weak recognition process utilizes the low-resolution mode of the one or more vision sensors 110 to generate a low-resolution image. The system 400 utilizes a segmentation technique to generate super-pixels and further splits the super-pixels to generate one or more segmented BLOBs (Binary Large OBjects). Each of the segmented BLOBs is a varying-length binary string representing a feature of the entity E1 108*a*. The segmentation of the low-resolution image is done to generate a segmented BLOB that corresponds to the facial features of the entity E1 108*a*, where the first classification algorithm is operable to implement the low-resolution mode to perform the initial validation, and the second classification algorithm is operable to implement the high-resolution mode to perform the validation.

The first classification algorithm of the first module 118, performing the weak recognition process, is operable to implement the low-resolution mode to perform the initial validation. The weak recognition process extracts a subset of features from the one or more segmented BLOBs of the low-resolution image. The facial features of the entity E1 108a may correspond to the subset of features of the entity E1 108a. The weak recognition process matches the features from the extracted subset of features with a stored template in the first memory bank 124.

The execution of the weak recognition process includes the one or more low computational detection techniques to generate the signal on detection of the entity E1 108a. Particularly, a detection module, such as an entity detector disposed on the first module 118, executes the one or more low computational detection techniques to generate the signal. In one example, the entity detector may utilize a radio communication using a Bluetooth Low Energy (BLE) to detect the entity E1 108a located within the defined vicinity of the vehicle 106. The one or more low computational detection techniques used by the weak recognition process requires the predetermined computational power. It should be noted that the first power source 122 being disposed on the vehicle 106 supplies the predetermined computational power to the first module 118. In an alternate embodiment, the one or more processors 112 is in operative association with the first power source 122.

It should be noted that in an alternate aspect, the first module 118 may also include an image processing circuit such as an Application-Specific Integrated Circuit (ASIC) being communicatively coupled to the one or more vision sensors 110. The ASIC assists the first module 118 to process the vision data signal received from the one or more vision sensors 110. Specifically, on receiving the vision data signal, the ASIC performs a real-time image processing on the low-resolution image data by executing the weak recognition process.

The first module 118 utilizes the stored template of the authorized entity in the first memory bank 124 to initially validate the detected entity E1 108a. The initial validation takes place once the detected entity E1 108a moves from the present location in the field of vision 104 of the one or more vision sensors 110 to the region of focus 102 of the one or more vision sensors 110, as entity E1' 108b. In an alternate embodiment, the system 200 may enable the initial validation while the detected entity E1 108a remains in the present location in the field of vision 104.

In another aspect of the present disclosure, once the first module 118 initially validates the detected entity E1 108a in the region of focus 102, an exterior keypad (not shown in the Figs.) gets activated to accept input from the initially validated entity E1' 108b. The exterior keypad gets activated by means of illumination. The exterior keypad may be located on an exterior portion of the vehicle 106. The initially validated entity E1' 108b may input a numeric code or an alphanumeric code, that is predetermined to unlock the vehicle 106. The one or more operational settings corresponds to a procedure to unlock if the validation is consistent with the stored template Further, the first module 118 transmits the signal to a personalization controller being communicatively linked thereto. It should be noted that the signal in the form of a weak user identification signal is received at the personalization controller. Further, the personalization controller is configured to detect the one or more vehicle operations endpoints 114 that are to be potentially accessed by the initially validated entity E1' 108b after being authorized by the second module 120. Thus, the personalization controller personalizes the one or more vehicle operations endpoints 114 to accumulate a predetermined amount of charge by deriving power from a general power source disposed on the vehicle 106. It should be noted that the first power source 122 that powers the first module 118 is independent of the general power source.

The personalization controller is configured to reduce high latency involved in activation of the vehicle 106 when the initially validated entity E1' 108b is identified as the authorized entity to manage the one or more vehicle operations endpoints 114. Thus, prior to initiating an identification process on the initially validated entity E1' 108b, the personalization controller is adapted to personalize the one or more vehicle operations endpoints 114, which is, to be potentially accessed by the initially validated entity E1' 108b. By personalization, the initially validated entity E1' 108b, if identified, can manage the one or more vehicle operations endpoints 114 without delay.

The signal from the first module 118 comprises either the positive authentication signal or the negative authentication signal. The positive authentication signal represents that the initially validated entity E1' 108b may be an authorized entity, prospectively eligible to manage the one or more vehicle operations endpoints 114. The positive authentication signal may also represent an unauthorized entity, who has been detected as per thresholds of the weak recognition process but fails identification at the strong recognition process. While the negative authentication signal represents that the initially validated entity E1' 108b is an unauthorized entity with denied access to the vehicle 106.

Further, the second module 120 being communicatively coupled to the first module 118 receives the signal that represents the positive authentication signal. The second module 120 then processes the positive authentication signal to identify the initially validated entity E1' 108b. The second module 120 processes the positive authentication signal by executing the one or more high computational detection techniques. For executing the one or more high computational detection techniques, the second module 120 requires the predetermined computational power, which is higher than the predetermined computational power required by the weak recognition process. The one or more high computational detection techniques may include, for example, identification of the initially validated entity E1' 108b by executing face identification/verification on the high-resolution image data to determine whether the initially validated entity E1' 108b is an authorized entity.

The strong recognition process utilizes the high-resolution mode of the one or more vision sensors 110. In an aspect of the present disclosure, the strong recognition process utilizes a cascade classifier algorithm of Viola-Jones to determine the facial features in the high-resolution image. Particularly, the algorithm of Viola-Jones is configured to detect a face for determining whether the detected face in the high-resolution image corresponds to a face of the authorized entity. In an embodiment, the strong recognition process utilizes a vision processor to perform one or more functions corresponding to the strong recognition process that is essentially utilized for the strong recognition process. The vision processor is in a one of a standby mode or a deactivated mode during the weak recognition process execution.

In an embodiment, a subset of the vision sensors performs the weak recognition process. The subset of the vision sensors is a camera Image Signal Processor (ISP) that includes a host microprocessor, a dedicated low power processor, or an Application Specific Integrated (ASIC). Upon validating the entity E1 108a using the weak recognition process, the strong recognition process is considered as a consecutive process. A dedicated vision processor is used for performing one or more functions corresponding to the strong recognition process, where the vision processor is for example, FGPA, ASIC, GPU, TPU, etc.

The second module 120 employs the second classification algorithm for performing the strong recognition process. The strong recognition process includes exhaustive machine learning methods and considers multiple features as variables and other computation extensive methods that consume more power for execution and have a greater runtime. The consideration of multiple features as variables contributes to greater complexity of the second module 120 compared to the first module 118. The vision processor used for executing the strong recognition process is a complex hardware that consumes higher power compared to the camera ISP for execution. The memory requirement for the strong recognition process, in an embodiment, is greater compared to the memory requirement of the weak recognition process.

The first module 118 that employs the first classification algorithm performs the weak recognition process to accomplish initial validation. The weak recognition process is a low computation detection technique executed using lesser power, lesser memory consumption and lesser runtime compared to the strong recognition process. The one or more camera ISPs used for the weak recognition process is a lesser complicated hardware compared to the vision processor and also consumes lower power compared to the vision processors.

During the execution of the weak recognition process, the vision processor, dedicated for the strong recognition process, and a corresponding memory are deactivated or in a standby mode. The deactivation leads to conservation of power as the strong and the weak recognition processes are performed sequentially, in an embodiment, and there is a nil or minimal requirement of the vision processor to be active during the weak detection process. The necessity of continually performing the strong recognition process is minimal, therefore, the weak recognition process and the strong recognition process is switched based on the operational settings. The switching allows optimal usage of the hardware resources and optimal power consumption based on the necessity thereby conserving power.

For executing the face identification/verification process, the second module 120 utilizes training data being stored in a neural network 130. In the illustrated aspect, the system 400 includes the second memory bank 126 that is disposed locally on at least a portion of the vehicle 106. It should be noted that the second memory bank 126 includes a database on the system 400 that includes a pre-stored dataset corresponding to the entities who are authorized entities of the vehicle 106. The neural network 130 utilizes the pre-stored dataset from the second memory bank 126 as the training data, which assists the second module 120 in the face identification/verification process.

The second module 120 utilizes the neural network 130 to classify the high-resolution image data of vision data signal, to determine the one or more features of the initially validated entity E1' 108b and to compare the one or more features with the pre-stored dataset. In an alternate aspect, the system 400 utilizes the neural network 130 to classify the image data of the entity E1' 108b, to determine the one or more features of the entity E1' 108b and to compare the one or more features with the pre-stored dataset using a Convoluted Neural Network (CNN) classifier. On comparing the one or more features with the pre-stored dataset, the second module 120 communicatively coupled to the one or more vehicle operations endpoints 114, transmits the authentication signal thereto.

The second module 120 is operable for executing an anti-spoofing module 128. The anti-spoofing module 128 may implement one or more of the techniques described in this disclosure. For example, the anti-spoofing module 128 may analyze the high-resolution image data captured by the one or more vision sensors 110 for possible spoofing and cause the second module 120 to either grant or deny the entity E1' 108b's request to proceed with authentication based on the analysis.

It should be noted that the authentication signal may include either the positive authentication signal or the negative authentication signal. In one example, the positive authentication signal represents that the initially validated and the validated entity E1' 108b is identified as the authorized entity. Thus, the system 400, on the generation of the positive authentication signal, grants permission to the authorized entity E1' 108b to perform the task corresponding to the one or more vehicle operations endpoints 114. While the generation of the negative authentication signal represents that the entity E1' 108b is identified as the unauthorized entity by the second module 120. Therefore, the initially validated entity E1' 108b is denied permission to perform the at least one task on the one or more vehicle operations endpoints 114.

The one or more operational settings is a sentry mode. One or more vision sensors 110, such as one or more exterior cameras can continuously track people and vehicles surrounding the vehicle 106. In the sentry mode the first classification algorithm includes a biometric key with user determination that determines if the entity E1 108a is a known or an unknown entity.

In an example, the weak recognition process in the first module 118 initially validates the entity E1 108a and provides the positive authentication signal to the strong recognition process in the second module 120. The strong recognition process then determines if there is a match between the face of the entity E1' 108b and the stored face template. Upon determining that there is no match, the second recognition process provides the negative authentication signal and initiates a threat analysis. The strong recognition process considers the entity E1' 108b to be a probable offender and stores data, such as facial features, in the second memory bank 126. In another scenario, if there is a match such that, based on identity of the entity E1' 108b, the entity E1' 108b is deemed to be an offender, then the second recognition process initiates the threat analysis. In another example, on initial validation, the weak recognition process provides a negative authentication signal to the strong recognition process. Upon receiving the negative authentication signal, the second recognition process initiates the threat analysis.

If the proximity of a probable offender, based on pixels on target or the identity of the probable offender based on a face identification by the weak recognition process, is deemed to be a threat or if a security system is triggered, then the vehicle 106 functions using the second classification algorithm. After the probable offender leaves vicinity of the vehicle 106 or if vision analysis characterization is complete and scene has insufficient motion, then the vehicle 106 switches from the second classification algorithm to the first classification algorithm.

In the sentry mode, the first classification algorithm includes vehicle tracking. In the sentry mode, the second classification algorithm includes high resolution image acquisition for recording, with threat analysis based on intent of the entity E1' 108b, such as gait, emotion, etc., to determine if the entity E1' 108b is a threat to the vehicle 106. The second classification algorithm, in an embodiment, also includes transmitting images to a cloud database to notify if a threat is deemed sufficient. In case of vehicle collision, vision analysis is performed that includes identifying license plate and make or model of offending vehicle. The sentry mode can be configured and operable to store vision data signal on a first memory bank upon execution of the first classification algorithm or a second memory bank upon execution of the second classification algorithm.

In another aspect of the present disclosure, the one or more vision sensors 110 may be mounted on at least a portion of the interior of the vehicle 106. A control area of the one or more vision sensors 110 would be bounded to an expected location of a driver's head in either the driver's seat or a front passenger's seat of the vehicle 106. In this scenario, it should be noted that the face of the entity E1' 108b, who is seeking permission to manage the one or more vehicle operations endpoints 114, is either at the driver's seat or the front passenger's seat. Once the face in the control area is identified by a secondary authentication process, the entity E1' 108b would be authorized to manage the one or more vehicle operations endpoints 114. It should be noted that identification of the entity E1' 108b using the secondary authentication process works in a manner like the identification of the initially validated entity E1' 108b by the strong recognition process. Once the face in the control area is identified, the one or more vision sensors 110 stops capturing images of entity E1 108a in the field of vision 104 of the one or more vision sensors 110 in order to reduce processing latency.

It should be noted that the system 400 may also include a driver assistance module being disposed on at least a portion thereof. The driver assistance module is configured to generate one or more vehicle control commands related to one or more driver assistance functions. The vehicle control commands are utilized to control the weak recognition process and the strong recognition process. When the weak recognition process initially validates the entity E1 108a in the field of vision 104 of the one or more vision sensors 110, the driver assistance module engages at least one driver assistance function, for example, the Welcome Mode. The driver assistance module is configured to control the strong recognition process such that the second module 120 is not activated till a time the entity E1' 108b, initially validated by the weak recognition process, enters the region of focus 102 of the vision sensors 110.

In yet another embodiment, an additional entity (not shown in the Figs.) is granted access if the authorized entity E1' 108b is initially validated by the first module 118 or validated by the second module 120. The additional entity may be an authorized entity with limited access to the vehicle 106. For this embodiment, the additional entity must be in the region of focus 102 of the one or more vision sensors 110. While the additional entity seeks permission to manage the one or more vehicle operations endpoints 114, the authorized entity E1' 108b with complete access to the vehicle 106 may be in the field of vision 104 of the one or more vision sensors 110 and detected by the first module 118. In an alternate embodiment, while the additional entity seeks permission to manage the one or more vehicle operations endpoints 114, the authorized entity E1' 108b with complete access to the vehicle 106 may be in the region of focus 102 of the one or more vision sensors 110 and identified by the second module 120.

Figure 5:
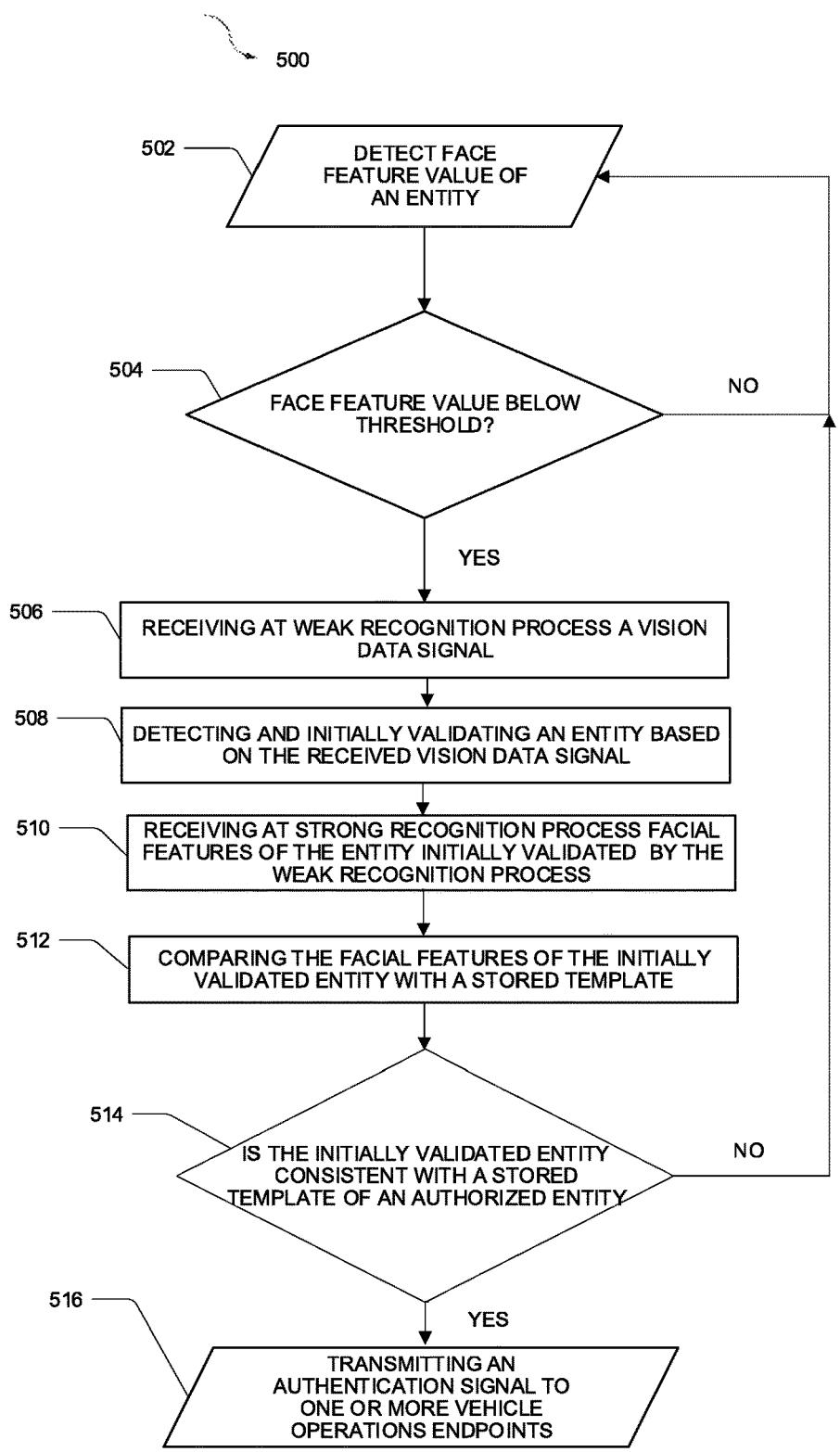
FIG. 5 illustrates a flowchart detailing a method for managing one or more vehicle operations endpoints, in accordance with at least one aspect of the present disclosure.

FIG. 5 shows a flowchart illustrating a method 500 for managing one or more vehicle operations endpoints 114 in the system, as described in FIGS. 1 to 4, as per one aspect of the present disclosure. The method 500 is provided by way of example, as there are a variety of ways to carry out the method. The method 500 described below may be carried out using the configurations illustrated in FIGS. 1 to 4 for example and various elements of these figures are referenced in explaining the example method 500. Each block shown in FIG. 5 represents one or more processes, methods, or subroutines, carried out in the example method 500. Furthermore, the illustrated order of blocks is illustrative only and the order of the blocks may change according to the present disclosure. Additional blocks may be added, or fewer blocks may be utilized, without departing from the scope of the present disclosure. The method begins at block 502.

At the block 502, the system is configured to detect the entity E1 108a by utilizing one or more features of the entity E1 108a, as represented by the vision data signal when the entity E1 108a enters the region of focus 102, that is the entity E1' 108b. The system is configured to monitor the field of vision 104 of the one or more vision sensors 110 to detect a presence of entity E1 108a, where the field of vision 104 of the vision sensors includes the region of focus 102. Further, the system is configured to track location of the entity E1 108a. The vision data signal includes the image data of the entity E1 108a as captured by the one or more vision sensors 110 mounted on the vehicle 106. The facial features of the entity E1 108a are a subset of the one or more features of the entity E1 108a. It should be noted that the facial feature value is determined as a function of the facial features. In the illustrated aspect, the system is configured to detect the entity E1 108a by utilizing the facial feature values of the entity E1 108a. As described in FIG. 4, the pigmentation of the iris of eyes may be considered as a facial feature. It should be noted that the entity E1 108a is in the field of vision 104 as covered by the vision sensors 110.

At block 504, the system determines whether the facial feature value of the entity E1 108a corresponds to the prestored facial feature value in the memory 116. The prestored facial feature value may correspond to a threshold value. Thus, if the system determines that the facial feature value of the entity E1 108a is below the threshold value, then the method moves to block 506. Else the system continues detecting the facial feature value of entities in the defined vicinity of the vehicle 106, as covered by the field of vision 104 of the vision sensors 110, by executing the block 502.

At block 506, the system is configured to receive the vision data signal at the weak recognition process. Further, at block 508, the system detects and initially validates the entity E1' 108b based on the vision data signal (as described in FIGS. 2 and 4).

At block 510, the strong recognition process receives the vision data signal along with the facial feature values of the entity E1 108a from the weak recognition process, once the weak recognition process has detected and initially validated the entity E1 108a in the field of vision 104 of the vision sensor.

At block 512, the strong recognition process identifies the initially validated entity E1' 108b based on the vision data signal. The strong recognition process uses one or more high computational detection techniques by utilizing the neural network 130 to identify the detected entity E1' 108b. The neural network 130 evaluates rules and data stored in the second memory bank 126 to assist the strong recognition process. The second memory bank 126 stores a template signal representative corresponding to entities, that is the stored template, who are authorized to manage one or more vehicle operations endpoints 114 and can be available onboard the vehicle 106. In an alternate aspect, the second memory bank 126 may be available remotely and can be accessed and retrieved via a network connection, such as Wi-Fi, a mobile network, or a distributed fleet network, etc. In order to execute the block 512, the strong recognition process compares the facial feature values of the initially validated entity E1' 108b with the stored template of the authorized entity.

At block 514, the method determines whether the facial feature values of the initially validated entity E1' 108b are consistent with the stored template of the authorized entity. If the initially validated entity E1' 108b is identified as the authorized entity, then the method moves to block 516; else the system repeats the tasks of detecting entities within the defined vicinity of the vehicle 106 by executing the block 502. Since the strong recognition process employs high computational detection techniques for identification of the initially validated entity E1' 108b and the weak recognition process employs low computational detection techniques for detection of the entity E1 108a, it should be noted that the strong recognition process operates with greater accuracy than the weak recognition process.

At block 516, on the identification of the initially validated entity E1' 108b as the authorized entity, the system transmits an authentication signal to the one or more vehicle operations endpoints 114. The initially validated entity E1' 108b is granted access to the vehicle 106 upon determining a match of the facial features of the entity with the stored template.

Figure 6:
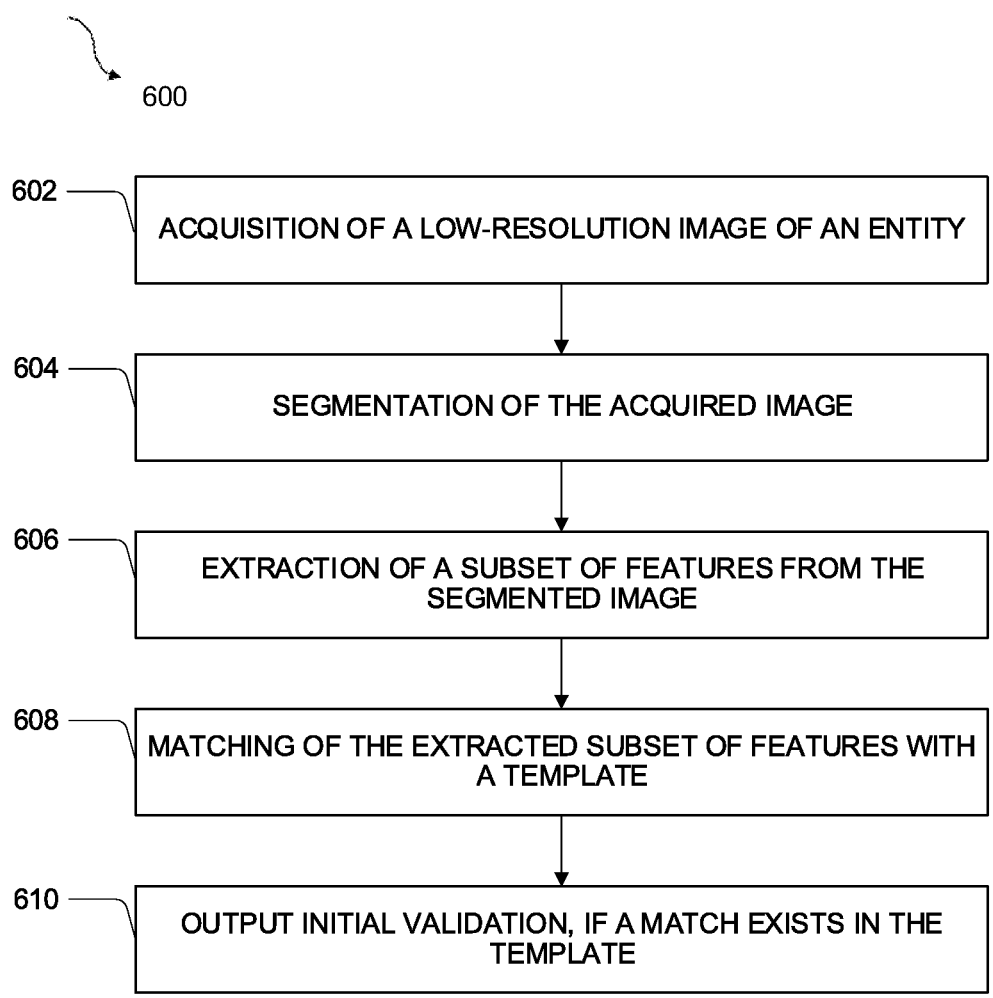
FIG. 6 illustrates a method performed to detect and initially validate an entity using a weak recognition process, in accordance with at least one aspect of the present disclosure.

FIG. 6 illustrates a method 600 performed by the system (shown in FIGS. 1 to 4) for initially validating the entity E1 108a using the weak recognition process, in accordance with one aspect of the present disclosure. The method 600 is provided by way of example, as there are a variety of ways to carry out the method. The method 600 described below may be carried out using the configurations illustrated in FIGS. 1 to 4, for example, and various elements of these Figs. are referenced in explaining example method 600. Each block shown in FIG. 6 represents one or more processes, methods, or subroutines, carried out in the example method 600. Furthermore, the illustrated order of blocks is illustrative only and the order of the block may change according to the present disclosure. Additional block may be added or fewer block may be utilized, without departing from the scope of the present disclosure. The method begins at block 602.

At the block 602, the system generates or acquires a low-resolution image of the entity E1 108a by utilizing the low-resolution mode of the vision sensors 110. On generation or acquisition of the low-resolution image, the method 600 moves to block 604.

At the block 604, the weak recognition process performs segmentation of the low-resolution image, as described in FIG. 4, that was generated at the block 602. The segmentation of the low-resolution image is done to generate the one or more segmented BLOB that corresponds to the facial features of the entity E1 108a. It should be noted that the facial feature value is determined as a function of the facial features.

Further, at block 606, the weak recognition process extracts a subset of features from the one or more segmented BLOBs of the low-resolution image.

Further, it should be noted that the system includes the first memory bank 124 comprising a stored template, such that the stored template represents prestored features of authorized entities.

At block 608, the weak recognition process performs a method of matching the features from the extracted subset of features with the stored template. For example, as per FIG. 5, if the extracted facial feature corresponds to the stored template including prestored facial features of the authorized entities, then the method moves to the block 610; else the method stops.

At the block 610, upon successful matching, an initial validation output is generated by the weak recognition process for further execution of the strong recognition process of identifying the initially validated entity E1' 108b.

Figure 7:
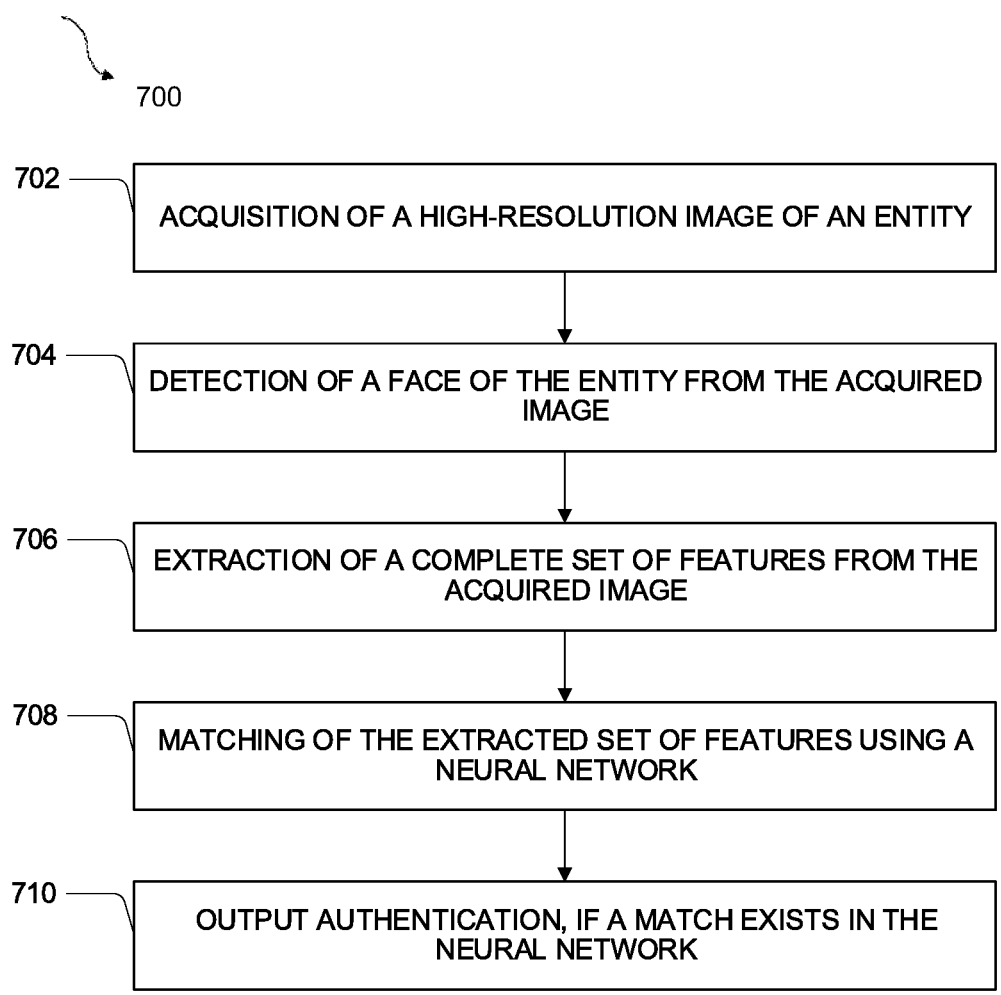
FIG. 7 illustrates a method performed to identify a detected and initially validated entity using a strong recognition process, in accordance with at least one aspect of the present disclosure.

FIG. 7 illustrates a method 700 performed by the system (shown in FIGS. 1 to 4) for identifying whether the initially validated entity E1' 108b located in the region of focus 102 of the one or more vision sensors 110, is an authorized entity to manage the one or more vehicle operations endpoints 114, in accordance with one aspect of the present disclosure. The method 700 is provided by way of example, as there are a variety of ways to carry out the method. The method 700 described below may be carried out using the configurations illustrated in FIGS. 1 to 4, for example, and various elements of these Figs are referenced in explaining example method 700. Each block shown in FIG. 7 represents one or more processes, methods, or subroutines, carried out in the example method 700. Furthermore, the illustrated order of steps is illustrative only and the order of the steps may change according to the present disclosure. Additional steps may be added, or fewer steps may be utilized, without departing from the scope of the present disclosure. The method begins at block 702.

At the block 702, the one or more vision sensors 110 operate at the high-resolution mode to generate a high-resolution image of the initially validated entity E1' 108b. In an alternate embodiment, the system generates a high-resolution image of the initially validated entity E1' 108b by executing the strong recognition process. Particularly, the strong recognition process performs an upsampling on the image data of the vision data signal from the one or more vision sensors 110 to generate the high-resolution image. It should be noted that the upsampling performed on the image data involves a predetermined high run-time and thus, consumes the predetermined computational power, which is higher than the computational power consumed during execution of the weak recognition process. On generation or acquisition of the high-resolution image of the initially validated entity E1' 108b, the method 700 moves to block 704.

At the block 704, the strong recognition process detects one or more features from the high-resolution image. It should be noted that the detection of the one or more features from the high-resolution image is configured for identifying the initially validated entity E1' 108b using the strong recognition process. In the illustrated aspect, the detection of the one or more features includes determining a facial feature to detect a face of the detected entity E1' 108b using the strong recognition process. For identifying the face of the detected entity E1' 108b, the method 700 moves to block 706.

At the block 706, the strong recognition process extracts a complete set of features from the high-resolution image. It should be noted that the second module 120 includes the neural network 130 that utilizes prestored data from the second memory bank 126. The second memory bank 126 is a database located on the vehicle 106. In an alternate aspect, the second memory bank 126 resides at a location, which is remote from the vehicle 106, as has been described in FIG. 4. As illustrated, the method 700 is configured to identify the initially validated entity E1' 108b by detecting and identifying the face thereof at the block 708.

Further, at the block 708, the strong recognition process matches the one or more features of the complete set of features with the prestored data. As illustrated, the second module 120 is configured to match the facial features from the extracted complete set of the one or more features with a prestored facial feature in the prestored data. The neural network 130 built in the second module 120 is configured for determining from the extracted complete set of the one or more features, illustrated herein as the facial feature, that whether the facial feature matches the prestored facial feature. If the facial feature of the initially validated entity E1' 108b matches the prestored facial feature, then the system performs block 710.

At the block 710, the strong recognition process in response to the block 708 generates an output in the form of an authentication signal, which enables the identified entity E1' 108b to manage the one or more vehicle operations endpoints 114.

Figure 8:
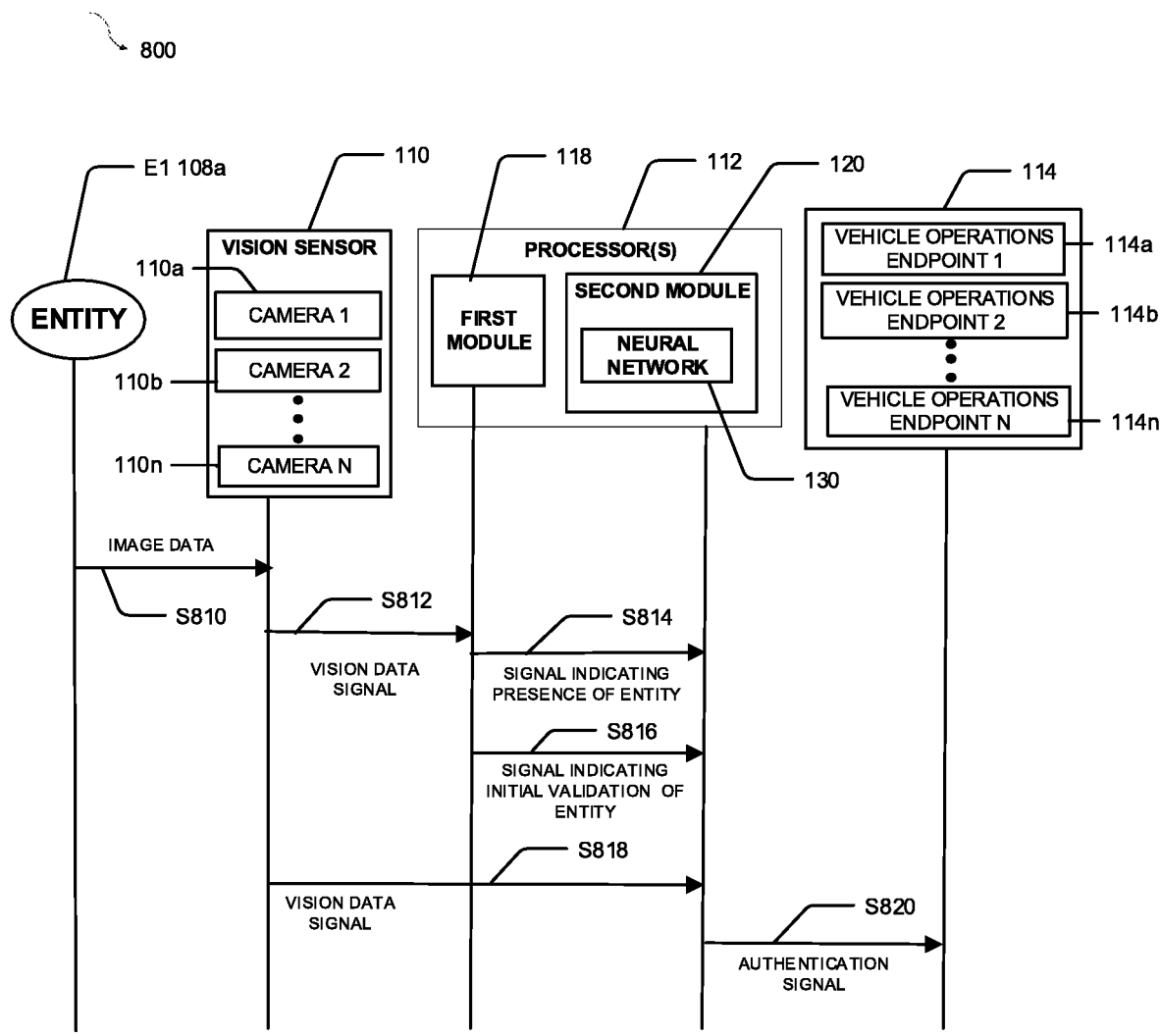
FIG. 8 shows a sequence diagram illustrating a process used for managing the one or more vehicle operations endpoints, in accordance with at least one aspect of the present disclosure.

FIG. 8 shows a sequence diagram illustrating a process used by the system (described in FIGS. 1 to 4) for managing the one or more vehicle operations endpoints 114. As illustrated, the system is configured for managing the one or more vehicle operations endpoints 114 using the first module 118 and the second module 120, which are coupled to the one or more processors 112. At step S810, the one or more vision sensors 110 capture an image of the entity E1 108a, and an image data is issued. The image data gets initiated whenever the entity E1 108a enters the field of vision 104 of the one or more vision sensors 110. The one or more vision sensors 110 is configured to capture the image of the entity E1 108a using one or more cameras 110a, 110b, . . . 110n when the entity E1 108a is within the field of vision 104 of the one or more vision sensors 110. The one or more cameras 110a, 110b, . . . 110n are mounted on at least a portion of an interior region or an exterior region of the vehicle 106. The one or more vision sensors 110 generate a vision data signal at step S812 that acts as an input for the first module 118. The vision data signal is representative of the image data.

The first module 118 generates a low-resolution image by utilizing the low-resolution mode of the one or more vision sensors 110. The first module 118 detects the presence of the entity E1 108a, as represented by the vision data signal, where one or more features of the entity E1 108a are present within the field of vision 104 of one or more vision sensors 110, using one or more low computational detection techniques, as described in FIGS. 2 and 4. The vision sensors 110 is referred as vision sources. The first module 118 utilizes a stored template of the authorized entity in the first memory bank 124 to initially validate the detected entity E1 108a, as described in FIGS. 2 and 4. At step S814, a signal indicating the presence of the entity E1 108a in the field of vision 104 of the one or more vision sensors 110 is generated by the first module 118 and received by the second module 120. At step S816, a signal indicating initial validation of the entity E1' 108b is generated by the first module 118 and received by the second module 120. The second module 120 also receives the high-resolution image of the entity E1' 108b from the one or more vision sensors 110 operating in the high-resolution mode, in the form of the vision data signal at step S818.

Based on the signals received from the first module 118 at steps S814, S816, and S818, the second module 120 is activated. The second module 120 uses one or more of high computational detection techniques to identify the entity E1' 108b as detected and initially validated by the first module 118, as described in FIGS. 2 and 4. Once the entity E1' 108b is identified as the authorized entity, the second module 120 sends an authentication signal at step S820 to the one or more vehicle operations endpoints 114.

Figure 9:
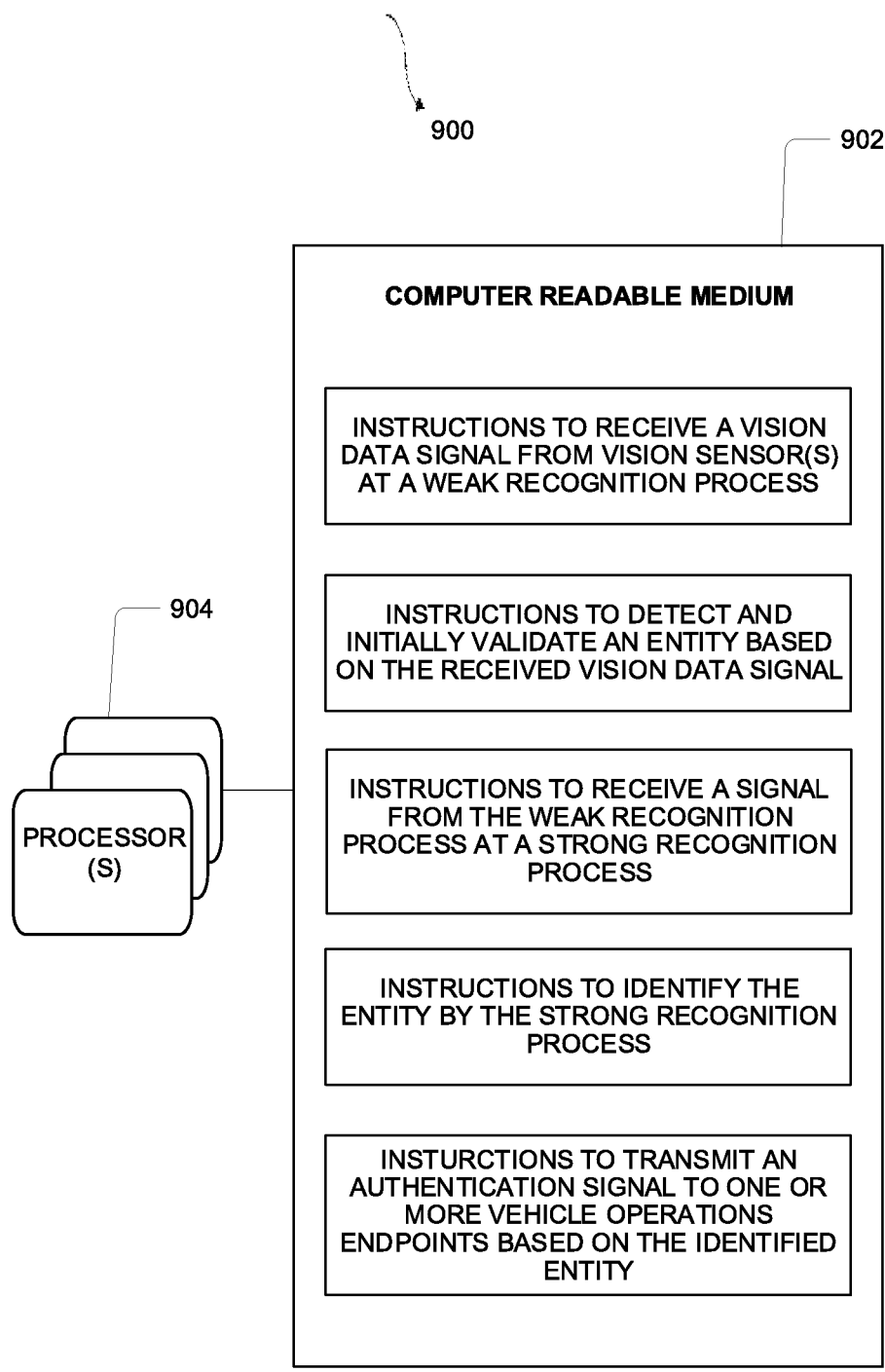
FIG. 9 illustrates an environment having a non-transitory computer-readable medium, in accordance with at least one aspect of the present disclosure.

FIG. 9 illustrates an environment 900 having a non-transitory computer-readable medium 902, in accordance with one aspect of the present disclosure. In the shown example, the environment 900 includes the non-transitory computer-readable medium 902 communicatively coupled to one or more processors 904. The non-transitory computer-readable medium 902 comprising instructions for causing the one or more processors 904 to perform a method for managing the one or more vehicle operations endpoints 114 (as shown in FIGS. 2 and 4).

The method comprises receiving a vision data signal from the one or more vision sensors 110 and detecting an entity E1 108a based on the vision data signal using the weak recognition process. The weak recognition process further executes instructions to initially validate the detected entity E1 108a based on the vision data signal. Subsequently, the method comprises receiving the vision data signal for identification of the entity E1' 108b using the strong recognition process, in response to a signal from the weak recognition process. Once the entity E1' 108b has been identified, the method transmits an authentication signal to one or more vehicle operations endpoints 114. The method may comprise further actions as described with reference to FIG. 5-FIG. 7. Furthermore, it will be appreciated that the non-transitory computer-readable medium 902 may be any suitable computer-readable medium, such as an optical disc, hard disk, solid-state memory, flash memory, etc., and maybe non-recordable or recordable.

The invention may thus also be implemented in a computer program for running on a programmable apparatus, at least including code portions for performing steps of a method according to the invention when run on the programmable apparatus, such as a computer system, or enabling a programmable apparatus to perform functions of a system according to the invention. The computer program may, for instance, include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a transitory or non-transitory, tangible medium, or data carrier, such as a CD-ROM or diskette, stored with data loadable in a memory of a programmable apparatus, the data representing the computer program.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A vehicle vision system comprising:
   a vehicle including one or more vision sensors coupled therewith, wherein each of the one or more vision sensors produces a vision data signal; and one or more processors and a memory communicatively coupled with the vehicle and/or the one or more vision sensors, the one or more processors operable to execute:
a first classification algorithm operable to perform an initial validation of the vision data signal; and
a second classification algorithm operable to perform a validation of the vision data signal,
wherein the one or more processors dynamically select the first classification algorithm that consumes low power and/or the second classification algorithm that consumes high power based on one or more vehicle operational settings that include a presence of an entity with a within a field of vision of the one or more vision sensors.

2. The vehicle vision system of claim 1, wherein the field of vision defines a recognition area within a region of focus when the entity is detected by the first classification algorithm.

3. The vehicle vision system of claim 2, wherein the region of focus is bounded to an expected location of a head of the entity.

4. The vehicle vision system of claim 1, wherein at least one of the one or more vehicle operational settings is a biometric authentication.

5. The vehicle vision system of claim 4, wherein an authorized validation is the biometric authentication of a stored facial template, a stored iris template, and/or a stored gait template of the entity within the field of vision.

6. The vehicle vision system of claim 1, wherein the first classification algorithm and the second classification algorithm each communicatively couple with a memory bank and wherein the memory bank stores a template signal representative of an authorized entity.

7. The vehicle vision system of claim 1, wherein the first classification algorithm uses a weak recognition process that executes on a first module that draws power from a first power source and the second classification algorithm uses a strong recognition process that executes on a second module that draws power from a general power source that is distinct from the first power source and wherein the strong recognition process is triggered based on initial validation by the weak recognition process.

8. The vehicle vision system of claim 7, wherein the strong recognition process includes more compute features than the weak recognition process, wherein the strong recognition process includes a neural-based technique, a trained model-based technique and a cascade face detection technique including a face identification/verification through identifying large variations in scale and occlusion, and wherein the weak recognition process includes a low-resolution mode, a reduced sampling rate and reduced illumination.

9. The vehicle vision system of claim 1, wherein the one or more vision sensors is located external to the vehicle.

10. The vehicle vision system of claim 1, wherein the one or more vision sensors is located internal to the vehicle.

11. The vehicle vision system of claim 1, wherein the one or more vision sensors comprises one or more cameras.

12. The vehicle vision system of claim 1, wherein the one or more vehicle operation settings is an unlocking procedure if the initial validation is consistent with a stored template.

13. The vehicle vision system of claim 1, wherein the one or more vision sensors are operable for operating in a high-resolution mode and/or a low-resolution mode.

14. The vehicle vision system of claim 13, wherein the first classification algorithm is operable to implement the low-resolution mode on a first module that draws power from a first power source to perform the initial validation, and the second classification algorithm is operable to implement the high-resolution mode on a second module that draws power from a general power source that is distinct from the first power source to perform the validation.

15. The vehicle vision system of claim 1, wherein the one or more vehicle operation settings is a pet mode if the initial validation is consistent with a stored template for a pet and/or animal in an interior of the vehicle, wherein the pet mode can activate one or more comfort settings of the vehicle.

16. The vehicle vision system of claim 1, wherein the one or more vehicle operation settings is a sentry mode if the initial validation of an entity within a field of view is not a stored template.

17. The vehicle vision system of claim 16, wherein the sentry mode can be operable to store, on a memory module, the vision data signal.

18. A system for detecting and identifying an entity for access to a vehicle, the system comprising:
at least one vision sensor, wherein the at least one vision sensor produces a vision data signal;
one or more processors and a memory coupled therewith, the one or more processors operable to execute instructions including:
a first module in operative communication with the vision sensor, wherein the first module comprises an application-specific integrated circuit and is operable for executing instructions including:
detecting an entity based on the vision data signal;
performing an initial validation of the entity; and
a second module, using a strong recognition process, in operative communication with the first module, wherein the second module is operable for executing instructions including:
validating the entity of the initial validation; and
transmitting an authentication signal to one or more vehicle operations endpoints based on a validated entity,
wherein the one or more processors dynamically select a first classification algorithm that consumes low power and/or a second classification algorithm that consumes high power based on one or more vehicle operational settings that include a presence of an entity with a within a field of vision of the one or more vision sensors.

19. A method for identifying an entity for access to a vehicle, the method comprising:
monitoring a field of vision of one or more vision sensors to detect a presence of an entity, wherein the field of vision of the one or more vision sensors comprises a region of focus;
tracking a location of the entity using a weak recognition process that consumes low power;
performing initial validation using the weak recognition process when the entity enters the region of focus; and
dynamically selecting a strong recognition process that consumes high power based on one or more vehicle operational settings, wherein facial features of the entity as initially validated by the weak recognition process are compared with a stored template and wherein the initially validated entity is granted access to the vehicle if the facial features of the entity are determined to match the stored template.

20. The system of claim 1, wherein the entity is first detected and validated by the first classification algorithm and then the second classification algorithm is selected based on sensor input.

* * * * *